US007484915B2

(12) United States Patent
Robson

(10) Patent No.: US 7,484,915 B2
(45) Date of Patent: Feb. 3, 2009

(54) ROUTER

(75) Inventor: Nigel Robson, Tyne & Wear (GB)

(73) Assignee: Black & Decker Inc., Newark, DE (US)

( * ) Notice: Subject to any disclaimer, the term of this patent is extended or adjusted under 35 U.S.C. 154(b) by 317 days.

(21) Appl. No.: 11/483,031

(22) Filed: Jul. 7, 2006

(65) Prior Publication Data

US 2008/0008551 A1 Jan. 10, 2008

(51) Int. Cl.
*B23C 1/20* (2006.01)

(52) U.S. Cl. ....................... 409/182; 409/137; 409/210; 144/136.95

(58) Field of Classification Search ................. 409/182, 409/181, 175, 137, 184, 210, 214, 218, 229; 144/136.95, 154.5, 252.1
See application file for complete search history.

(56) References Cited

U.S. PATENT DOCUMENTS 1,581,720 A 4/1926 Carter
1,904,109 A 4/1933 Wendorf
3,767,876 A 10/1973 Batson
3,881,081 A 4/1975 Schilling et al.
4,051,880 A 10/1977 Hestily
4,316,685 A 2/1982 George
4,319,860 A 3/1982 Beares
4,323,100 A 4/1982 Silken
4,382,728 A * 5/1983 Anderson et al. ........... 409/137
4,445,811 A 5/1984 Sanders
4,562,872 A 1/1986 Fushiya et al.
4,566,830 A 1/1986 Maier et al.
4,606,685 A 8/1986 Maier et al.
4,770,573 A 9/1988 Monobe
RE33,045 E 9/1989 Gronholz
4,938,264 A 7/1990 Ferenczffy
4,938,642 A 7/1990 Imahashi et al.
5,078,557 A 1/1992 McCraken
5,088,865 A 2/1992 Beth et al.
5,094,575 A 3/1992 Kieser
5,143,494 A 9/1992 McCurry
5,181,813 A 1/1993 McCraken (Continued)

FOREIGN PATENT DOCUMENTS

DE 3404869 A1 * 8/1985

(Continued)

OTHER PUBLICATIONS

EPO Search Report for 06114202.2-230.*

(Continued)

*Primary Examiner*—Erica E Cadugan
(74) *Attorney, Agent, or Firm*—Rhonda L. Barton; Scott B. Markow

(57) ABSTRACT

A router includes a motor housing, a motor provided in the motor housing driving a collet for turning a cutting tool, and a base for resting on a workpiece. Support columns mounted to the base allow the motor housing to move relative to the base in a direction parallel to the rotational axis of the cutting tool. The support columns are spaced apart in a direction transverse to the rotational axis, and the motor housing is connected to the support columns by means of support members spaced apart in a direction parallel to the rotational axis.

11 Claims, 2 Drawing Sheets

U.S. PATENT DOCUMENTS

| | | | | | |
|---|---|---|---|---|---|
| 5,188,492 | A | | 2/1993 | McCraken | |
| 5,191,921 | A | | 3/1993 | McCurry | |
| 5,207,253 | A | | 5/1993 | Hoshino | |
| 5,273,089 | A | | 12/1993 | Fuchs et al. | |
| 5,308,201 | A | | 5/1994 | Wilson et al. | |
| 5,310,296 | A | | 5/1994 | McCurry | |
| 5,320,463 | A | | 6/1994 | McCurry | |
| 5,326,200 | A | * | 7/1994 | Suzuki | 409/137 |
| 5,353,852 | A | | 10/1994 | Stolzer | |
| 5,375,952 | A | * | 12/1994 | Line | 409/202 |
| 5,428,197 | A | | 6/1995 | McCurry | |
| 5,496,139 | A | | 3/1996 | Ghode | |
| 5,570,776 | A | | 11/1996 | Buchholz | |
| 5,584,620 | A | | 12/1996 | Blickhan | |
| 5,590,988 | A | | 1/1997 | Rusconi | |
| 5,613,813 | A | | 3/1997 | Winchester et al. | |
| 5,671,789 | A | | 9/1997 | Stolzer et al. | |
| 5,678,965 | A | | 10/1997 | Strick | |
| 5,725,036 | A | | 3/1998 | Walter | |
| 5,853,273 | A | | 12/1998 | Coffey | |
| 5,853,274 | A | | 12/1998 | Coffey et al. | |
| 6,237,657 | B1 | * | 5/2001 | Qian | 144/252.1 |
| 6,261,036 | B1 | | 7/2001 | Bosten et al. | |
| 6,474,378 | B1 | * | 11/2002 | Ryan et al. | 144/154.5 |
| 6,792,984 | B2 | * | 9/2004 | Fontaine | 144/135.2 |
| 6,926,479 | B1 | * | 8/2005 | Taylor | 409/182 |
| 2003/0002947 | A1 | * | 1/2003 | Hathcock et al. | 409/182 |
| 2006/0045643 | A1 | * | 3/2006 | Petersen | 409/182 |

FOREIGN PATENT DOCUMENTS

| | | | | |
|---|---|---|---|---|
| EP | 670201 | A1 | * | 9/1995 |
| GB | 1015225 | | | 12/1965 |
| GB | 1590290 | | | 5/1981 |
| GB | 2078028 | | | 12/1981 |
| GB | 2145678 | | | 4/1985 |
| GB | 2248987 | | | 4/1992 |
| WO | WO-2007/121535 | A1 | * | 11/2007 |

OTHER PUBLICATIONS

PCT Search Report for PCT/EP2006/062781.*

* cited by examiner

ROUTER

CROSS REFERENCE TO RELATED APPLICATIONS

This application claims priority, under 35 U.S.C. § 119(a), to United Kingdom Patent Application No. GB 0513856.5, filed Jul. 7, 2005, which is incorporated herein by reference.

TECHNICAL FIELD

This application relates to a router.

BACKGROUND

A known type of router, sold by The Black & Decker Corporation under part number KW800, is shown in FIG. 1. The router 2 has a motor housing 4 containing a motor (not shown) for driving a collet 6 to which a cutting or milling tool (not shown) is mounted to engage a workpiece (not shown) through an aperture 8 in a base 10. The motor housing 4 is mounted to a support member 12, and a pair of handles 14, 16 are integrally formed with the support member 12. The handles 14, 16 are mounted to respective inclined portions 14*a*, 16*a*, which extend from respective vertical portions 14*b*, 16*b*. The support member 12 has front and rear portions between which the motor housing is fixed in position by clamping the lower part of the motor housing 4 between the front and rear portions of the support member 12.

The support member 12 is slidably mounted relative to the base 10 by means of support columns 18, 20 which pass through the support member 12 and through respective vertical portions 14*b*, 16*b*, and is urged upwardly by respective compression springs 22, 24. The minimum separation of the support member 12 and base 10 is set by means of an upper abutment member 26 slidably mounted through an aperture in the support member 12 and fixable in position by means of a thumb screw 28. The abutment member 26 co-operates with a platform 30 which is rotatable relative to the base 10 and on which three lower abutment members 32, 34, 36 of different lengths are mounted, so that any one of the lower abutments members 32, 24, 36 can come into contact with the upper abutment member 26 when the support member 12 is moved downwards towards the base 10. The minimum separation between the support member 12 and base 10 (and therefore the depth of cutting of the cutting tool in the workpiece) is set by suitable choice of the axial position of the upper abutment member 26 in the support member 12 and the rotational position of the platform 30 on the base 10 to set the separation of support member 12 and base 10 at which the upper abutment member 26 comes into contact with one of the lower abutment members 32, 34, 36.

The router shown in FIG. 1 suffers from a number of drawbacks. For example, because the motor housing 4 is clamped between the front and rear portions of the support member 12 at its lower part, the motor housing 4 engages a relatively shallow recess in the support member 12 and it is therefore possible to misalign the motor housing 4 with the support member 12. This can result in the cutting tool mounted to the collet 6 not being arranged vertically. Also vibration of the motor in the motor housing 4 can cause lateral oscillation of the cutting tool. In addition, because the support columns 18, 20 pass through relatively short vertical portions 14*b*, 16*b* respectively, some angular movement of the motor housing 4 relative to the base 10 is possible as a result of manufacturing tolerances between the internal diameter of vertical portions 14*b*, 16*b* and support columns 18, 20. All of these factors can have a detrimental effect on the accuracy with which the cutting tool can cut.

SUMMARY

In an aspect, a router includes a motor housing, a motor provided in the motor housing for turning a cutting tool, and a base for engaging a workpiece. A plurality of support columns is mounted to the base for allowing the motor housing to move relative to the base in a direction substantially parallel to a rotational axis of the cutting tool. A plurality of the support columns are spaced apart in a direction transverse to the rotational axis, and the motor housing is connected to a plurality of the spaced apart support columns by means of a plurality of support members. A plurality of the support members are spaced apart in a direction parallel to the rotational axis.

By mounting the motor housing to a plurality of the spaced apart support columns by means of a plurality of support members spaced apart in a direction parallel to the rotational axis of the cutting tool, makes it more difficult to misalign the motor housing with the base when the router is assembled, and minimizes the angular movement of the motor housing relative to the base which can occur. Also, vibrations produced by the motor in the motor housing are more effectively absorbed, and cause less transverse movement of the cutting tool. All of these have the improve the cutting accuracy of the cutting tool.

Implementations of this aspect may include one or more of the following features.

At least one support member may include a pair of handles for gripping by a user. The router may include biasing means for urging said motor housing away from said base. The base may include an aperture for allowing the cutting tool to pass therethrough to engage the workpiece. A plurality of the spaced apart support columns may be telescopic columns. At least one telescopic column may be hollow and the base may include at least one channel connecting said aperture to a respective said hollow telescopic column. This enables the hollow telescopic column to be connected to a suction source, which enables dust generated by the cutting tool to be removed to minimize the extent to which said dust obscures visibility of the cutting tool.

The router may include a height adjustment device for allowing the minimum separation of the motor housing and the base to be adjusted. The height adjustment device may include at least one abutment member adapted to be mounted to at least one said support member and to limit the extent to which the motor housing can move towards the base The position of the at least one abutment member may be adjustable relative to the support member to which it is mounted in use. The height adjustment device may further include a rack and pinion mechanism connecting at least one said abutment member to at least one said support member to allow adjustment of the position of the abutment member relative to the support member. The motor housing may be mounted to the plurality of support columns by means of a first support member adjacent a first end of the motor housing and a second support member adjacent a second end of the motor housing.

Other features will be apparent from the description, the drawings, and the claims.

DETAILED DESCRIPTION

Figure 1:
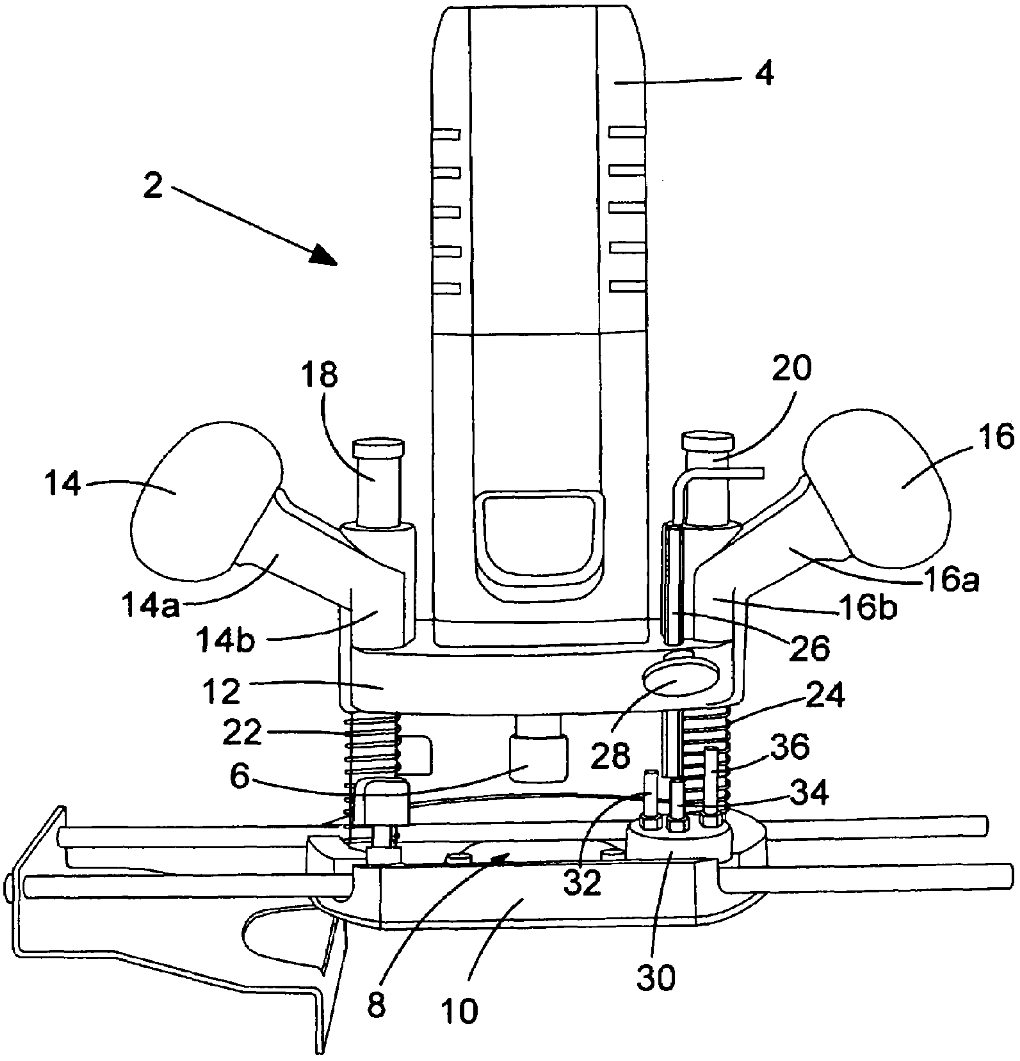
FIG.1 PRIOR ART
FIG. 1 is a front view of a known router.
Figure 2:
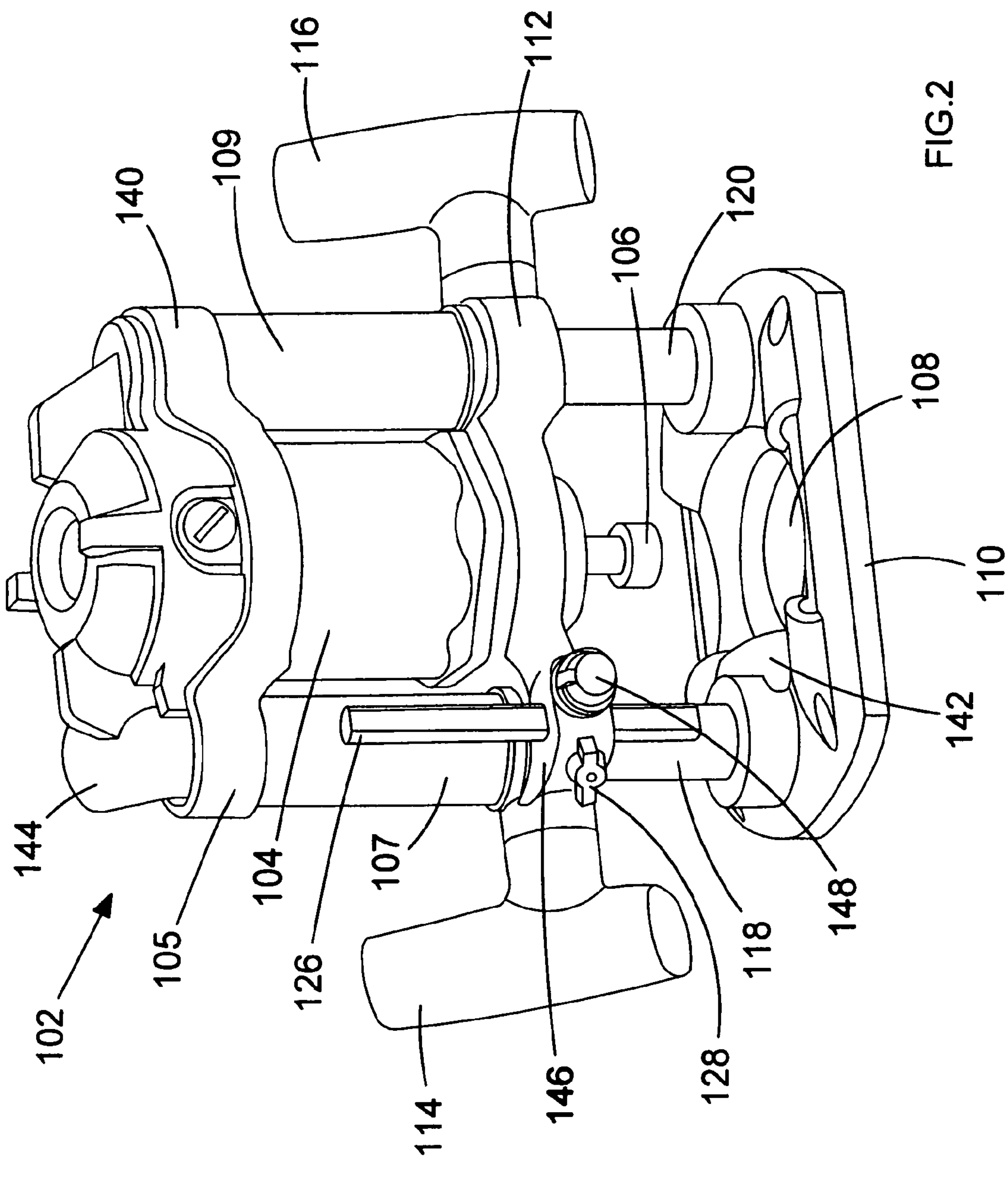
FIG. 2 is a perspective view of a router embodying the present invention.

Referring to FIG. 2, in which parts common to the router of FIG. 1 are denoted by like reference numerals but increased by 100, a router 102 embodying the present invention includes a motor housing 104 containing a motor (not shown) for driving a collet 106 to which a cutting tool (not shown) is mounted in use for engaging a workpiece (not shown) through an aperture 108 in a base 110 which rests on the workpiece.

The motor housing 104 is mounted to a router frame 105 having a first support member 112 mounted to a lower part of the motor housing 104 and a second support member 140 mounted to an upper part of the motor housing 104. The support members 112, 140 are mounted to a pair of hollow cylinders 107, 109, and the lower support member 112 is provided with a pair of handles 114, 116, one of which is provided with a switch (not shown) for actuating the motor in the motor housing 104.

The router frame 105 is slidably mounted relative to the base 110 by means of support columns 118, 120 which are mounted to the base 110 and are slidably mounted within the hollow cylinders 107, 109 respectively of the router frame 105 so that the router frame 105 can be pushed downwardly relative to the base 110 against the action of a spring (not shown) provided on at least one of the support columns 118, 120. In particular, one of the support columns 118, 120 is slidably mounted within the corresponding hollow cylinder 107, 109, and a helical tension spring (not shown) is either connected directly between the support column 118, 120 and corresponding hollow cylinder 107, 109, or is connected, at its lower end, to a retaining bush fastened to a guide tube which surrounds the support column 118, 120 and is arranged between the support column 118, 120 and the corresponding hollow cylinder 107, 109, and at its upper end to a holding ring secured to the upper end of the support column 118, 120.

The support column 118 is hollow and connects a channel 142 communicating with aperture 108 in base 110 with an outlet 144 which can be connected to a suitable suction source such as a vacuum cleaner to enable dust produced by the cutting tool to be removed to prevent it from obscuring visibility of the tool.

A height adjustment abutment member 126 is slidably mounted to a bracket 146 on lower support member 112 and can be fixed in position by means of a thumb screw 128. A rack and pinion mechanism (not shown) enables fine adjustment of the axial position of the abutment member 126 relative to the bracket 146 by means of a further thumbscrew 148. By suitable adjustment of the axial position of abutment member 126, the depth of cutting of the cutting tool in collet 106 is adjusted and is set by the position with which the lower end of the abutment member 126 comes into abutment with either the base 110 or one or more suitable further abutment members (not shown) mounted to the base 110.

The router shown in FIG. 2 has the advantage that because the motor housing 104 is restrained by spaced apart support members 112, 140 adjacent its upper and lower ends, vibrations generated by the motor in the housing 104 are more effectively absorbed, and mis-alignment of the motor housing 104 relative to the router frame 105 is more difficult. Also, because the motor housing 104 is mounted to the support columns 118, 120 at locations further apart than in the case of the router of FIG. 1 (at least when the motor housing 104 is in its lowered position relative to the base 110 during cutting by the tool), angular movement of the router frame 105 relative to the base 110 is minimised. As a result, lateral variation in the position of the cutting tool mounted to collet 106 is minimised, and the accuracy of cutting of the tool is thereby improved.

It will be appreciated by persons skilled in the art that the above embodiment has been described by way of example only, and not in any limitative sense, and that various alterations and modifications are possible without departure from the scope of the invention as defined by the appended claims. For example, the support members 112, 140 may be formed integrally with or separable from the hollow cylinders 107, 109. These and other implementations are within the scope of the following claims.

What is claimed is:

1. A router comprising:

a motor housing;

a motor provided in the motor housing for turning a cutting tool;

a base for engaging a workpiece, wherein the base includes an aperture for allowing the cutting tool to pass therethrough to engage the workpiece; and a plurality of support columns mounted to said base for allowing the motor housing to move relative to the base in a direction substantially parallel to a rotational axis of the cutting tool, wherein said plurality of support columns are spaced apart in a direction transverse to said rotational axis, and said motor housing has first and second terminal ends spaced apart in a direction parallel to said rotational axis, and is connected to said plurality of spaced apart support columns by a plurality of support members, and said plurality of support members are spaced apart in a direction parallel to said rotational axis such that a first support member of said plurality of support members at least partly surrounds said plurality of support columns and is located proximate the first terminal end and a second support member of said plurality of support members at least partly surrounds said plurality of support columns and is located proximate the second terminal end.

2. A router according to claim 1, wherein at least one said support member includes a pair of handles for gripping by a user.

3. A router according to claim 1, further comprising biasing means for urging said motor housing away from said base.

4. A router according to claim 1, wherein the aperture for allowing the cutting tool to pass therethrough to engage the workpiece is located between said support columns.

5. A router according to claim 1, wherein said plurality of spaced apart support columns are telescopic columns.

6. A router according to claim 5, wherein at least one of said telescopic columns is hollow and said base includes at least one channel connecting said aperture to a respective said hollow telescopic column.

7. A router according to claim 1, further comprising a height adjustment device for allowing the minimum separation of the motor housing and the base to be adjusted.

8. A router according to claim 7, wherein the height adjustment device comprises at least one abutment member adapted to be mounted to at least one of said plurality of support members and to limit the extent to which the motor housing can move towards the base.

9. A router according to claim 8, wherein the position of at least one said abutment member is adjustable relative to the support member to which it is mounted in use.

10. A router according to claim 8, wherein the height adjustment device further comprises a rack and pinion mechanism connecting at least one said abutment member to at least one said support member to allow adjustment of the position of the abutment member relative to the support member.

11. A router according to claim 1, wherein said first support member and said second support member are located at an external periphery of said support columns and of said motor housing.

* * * * *